(12) United States Patent
Wagener et al.

(10) Patent No.: US 7,723,461 B1
(45) Date of Patent: May 25, 2010

(54) POLYMERIC MATERIALS FROM RENEWABLE RESOURCES

(75) Inventors: Earl H. Wagener, Clemson, SC (US); Dennis W. Smith, Jr., Seneca, SC (US)

(73) Assignee: Tetramer Technologies, LLC

( * ) Notice: Subject to any disclaimer, the term of this patent is extended or adjusted under 35 U.S.C. 154(b) by 262 days.

(21) Appl. No.: 11/644,437

(22) Filed: Dec. 22, 2006

Related U.S. Application Data

(60) Provisional application No. 60/752,793, filed on Dec. 22, 2005.

(51) Int. Cl.
C08G 63/08 (2006.01)
(52) U.S. Cl. .................. 528/354; 525/450; 525/452; 525/454; 528/367
(58) Field of Classification Search .............. 525/450, 525/320
See application file for complete search history.

(56) References Cited

U.S. PATENT DOCUMENTS

| | | | |
|---|---|---|---|
| 3,993,663 A * | 11/1976 | Takiyama et al. | ........... 549/335 |
| 4,966,982 A | 10/1990 | Ono et al. | |
| 5,011,946 A | 4/1991 | Hess et al. | |
| 5,053,522 A | 10/1991 | Muller | |
| 5,136,057 A | 8/1992 | Bhatia | |
| 5,142,023 A | 8/1992 | Gruber et al. | |
| 5,149,833 A | 9/1992 | Hess et al. | |
| 5,247,058 A | 9/1993 | Gruber et al. | |
| 5,247,059 A | 9/1993 | Gruber et al. | |
| 5,258,488 A | 11/1993 | Gruber et al. | |
| 5,274,073 A | 12/1993 | Gruber et al. | |
| 5,274,127 A | 12/1993 | Sinclair et al. | |
| 5,357,035 A | 10/1994 | Gruber et al. | |
| 5,691,444 A * | 11/1997 | Shalaby et al. | .............. 528/357 |
| 6,005,067 A | 12/1999 | Gruber et al. | |
| 6,326,458 B1 | 12/2001 | Gruber et al. | |
| 6,649,715 B1 | 11/2003 | Smith et al. | |
| 6,689,855 B2 | 2/2004 | Smith et al. | |
| 6,696,534 B2 | 2/2004 | Smith et al. | |
| 7,071,288 B2 | 7/2006 | Smith et al. | |
| 7,256,250 B2 * | 8/2007 | Tuominen et al. | ........... 528/272 |

FOREIGN PATENT DOCUMENTS

| | | | |
|---|---|---|---|
| FI | 20011999 | * | 11/2002 |
| WO | WO 03076530 A2 | | 9/2003 |

OTHER PUBLICATIONS

Mark, et. al., eds. Encyclopedia of Polymer Science and Engineering, 2nd ed. Polyesters, vol. 12., p. 258. J. Wiley and Sons: New York, NY. 1985.*
Copolymers of Itaconic Anhydride and Methacrylate-Terminated Poly(lactic acid) Macromonomers—Joshua A. Wallach and Samuel J. Huang, *Biomacromolecules 2000*, 1, 174-179.
Multicomponenet Polymers of Poly(lactic acid) Macromonomers with Methacrylate Terminal and Copolymers of Poly (2-Hyroxyethyl Methacrylate)—Samuel J. Huang and John M. Onyari,—*J.M.S.—Pure appl. Chem.*, A33(5), pp. 571-584 (1996).
Terpolymers from Lactide and Bisphenol A Derivatives: Introducing Renewable Resource Monomers into Commodity Thermoplastics—Authors, N. Abayasinghe and D. Smith Jr.—*Macromolecules 2003*, 36, 9681-9683.
Degradable polymers for the future—Authors, A.C. Albertsson and S. Karlsson—*Acta Polymer.*, 46, 114-123 (1995).
Toughening of Polylactide by Melt Blending with Linear Low-Density Polyethylene—Authors, K.S. Anderson, S.H. Lim, and M.A. Hillyer—*Journal of Applied Polymer Science*, vol. 89, 3757-3768 (2003).
Influence of Cure Conditions on Glass Transition Temperature and Density of an Epoxy Resin—Authors, M. Cizmecioglu, A. Gupta, and R.F. Fedors—*Journal of Applied Polymer Science*, vol. 32, 6177-6190 (1986).
Polylactic Acid Technology—Authors, R.E. Drumright, P.R. Gruber, and D.E. Henton—*Advanced Materials Research News*, 12, 1841 (2000).
The Sustainability of NatureWorks™ Polylactide Polymers and Ingeo™ Polylactide Fibers[a]: an Update of the Future—Authors, E.T.H. Vink et al.—*Macromolecular Bioscience 2004*, 4, 551-564.
Applications of life cycle assessment to NatureWorks™ polylactide (PLA) production—Authors, E.T.H Vink et al.—*Elsevier Science Ltd.*, 80 (2003) 403-419.
Novel High-Temperature Aromatic Copolyester Thermosets: Synthesis, Characterization, and Physical Properties—Authors D. Frich, et al.—*Macromolecules 1996*, 29, 7734-7739.
Characterization of Polylactide-b-polyisoprene-b-polylactide Thermoplastic Elastomers—Authors, E.M. Frick, et al.—*Biomacromolecules 2003*, 4, 216-223.
Rubber Elasticity in Highly Crosslinked Polyesters—Authors, D. Katz and A.V. Tobolsky—*Journal of Polymer Science: Part A* vol. 2 pp. 1587-1594 (1964).
Stereoselective Ring-Opening Polymerization of rac-Lactide with a Single-Site, Racemic Aluminum Alkoxide Catalyst: Synthesis of Stereoblock Poly(lactic acid)—Authors, T.M. Ovitt and G.W. Coates—*J. Am. Chem. Soc. Part A: Poly. Chem.*, 38, 4686 (2000).

(Continued)

*Primary Examiner*—Randy Gulakowski
*Assistant Examiner*—Kyle Baumstein
(74) *Attorney, Agent, or Firm*—Dority & Manning, P.A.

(57) ABSTRACT

Disclosed are polymers that include components produced from renewable resources and methods for forming the disclosed polymers. The polymers include the reactive intermediates that in turn include components derived from, for example, lactide or sorbitol. The reactive intermediates can be polymerized with each other as well as with more traditional resins to form polymeric networks. In one embodiment, the disclosed intermediates can be utilized in forming vinyl ester resins. In particular, the vinyl ester-styrene resins and thermoset networks formed therefrom including the disclosed intermediates can include lower styrene content than previously known vinyl ester-styrene resins, and can exhibit physical characteristics such as glass transition temperature and flexural strength properties equal to previously known vinyl ester-styrene resins that include a higher styrene content.

39 Claims, 11 Drawing Sheets

OTHER PUBLICATIONS

Stereoselective Ring-Opening Polymerization of meso-Lactide: Synthesis of Syndiotactic poly(lactic acid)—Authors, T.M. Ovitt and G.W. Coates—*J. Am. Chem. Soc. 1999*, 121, 4072-4073.

Stereoselective Polymerization of a Racemic Monomer with a Racemic Catalyst: Direct Preparation of the Polylactic Acid Stereocomplex from Racemic Lactide—Authors, C.P. Radano, et al.—*J. Am. Chem. Soc. 2000*, 122, 1552-1553.

Directions for Environmentally Biodegradable Polymer Research—Auhor, Graham Swift—*Acc. Chem. Res. 1993*, 26, 105-110.

Monsanto, Pharmacia to Merge; Spin Off Agchems—Author, R. Westervelt—*Chemical Week* (Jan. 5, 2000).

* cited by examiner

| Code | wt % LAHEMA | wt % Styrene | wt % VER | Kinetic Viscosity cST | Flexural properties | | T_g Scan 7 °C | Boiling Water Test | | % extractable in | |
|---|---|---|---|---|---|---|---|---|---|---|---|
| | | | | | Modulus MPa | Strength MPa | | % wt increase | % soluble matter lost | CH$_2$Cl$_2$ | THF |
| 0-100-0 | 100 | 0 | 0 | 701.2 | | | | | | | |
| 45-0-55 | 0 | 45 | 55 | 303.2 | 2975.5 | 146.8 | 124 | 0.67 | -0.31 | 0.1 | 0.3 |
| stdev | | | | | 311.4 | 6.9 | | 0.03 | 0.03 | 0.0 | 0.0 |
| 35-0-65 | 0 | 35 | 65 | 1197.0 | 3136.1 | 152.6 | 129 | 0.70 | -0.21 | 1.2 | 1.1 |
| stdev | | | | | 220.2 | 4.8 | | 0.03 | 0.02 | 0.3 | 0.1 |
| 30-0-70 | 0 | 30 | 70 | 8000+ | 2873.7 | 154.3 | 126 | 0.77 | -0.22 | | |
| stdev | | | | | 449.0 | 3.8 | | 0.01 | 0.01 | | |
| 33-6-61 | 6 | 33 | 61 | | 3308.2 | 153.6 | 123 | 0.81 | -0.18 | 3.5 | 2.4 |
| stdev | | | | | 332.0 | 3.0 | | 0.02 | 0 | 0.9 | 0.6 |
| 27-9-64 | 9 | 27 | 64 | 6853.3 | 2956.8 | 147.6 | 120 | 0.91 | -0.24 | 1.2 | 1.3 |
| stdev | | | | | 110.0 | 3.4 | | 0.02 | 0.02 | 0.5 | 0.2 |
| 31-12-57 | 12 | 31 | 57 | 1722.0 | 3415.3 | 142.2 | 118 | 1.09 | -0.38 | 1.9 | 1.0 |
| stdev | | | | | 139.3 | 5.8 | | 0.09 | 0.04 | 0.3 | 0.2 |
| 25-17-58 | 17 | 25 | 58 | | 3246.8 | 143.9 | 112 | 1.12 | -0.49 | 3.8 | 1.3 |
| stdev | | | | | 121.8 | 5.1 | | 0.04 | 0.01 | 1.4 | 0.1 |
| 35-21-44 | 21 | 35 | 44 | 343.2 | 3144.4 | 138.0 | 107 | 1.06 | -0.31 | 2.5 | 3.3 |
| stdev | | | | | 107.1 | 10.6 | | 0.03 | 0.02 | 0.48 | 0.81 |
| 24-21-55 | 21 | 24 | 55 | | 3161.5 | 141.6 | 116 | 1.21 | -0.38 | 2.13 | 1.92 |
| stdev | | | | | 242.1 | 5.4 | | 0.02 | 0.02 | 1.27 | 0.44 |
| 30-28-42 | 28 | 30 | 42 | 434.8 | 3391.7 | 131.6 | 94 | 1.03 | -0.25 | 4.76 | 2.50 |
| stdev | | | | | 103.13 | 15.14 | | 0.08 | 0.04 | 0.81 | 0.42 |

Figure 14

POLYMERIC MATERIALS FROM RENEWABLE RESOURCES

CROSS-REFERENCE TO RELATED APPLICATION

The present application claims filing benefit of U.S. Provisional Patent Application Ser. No. 60/752,793 having a filing date of Dec. 22, 2005

BACKGROUND

The production of polymers through utilization of renewable resources has been a field of increasing interest for many years. For example, great interest has been shown in polymers formed from lactic acid. Lactic acid occurs in nature via fermentation of carbohydrates such as glucose, sucrose, and lactose. Lactic acid is commercially produced by fermentation of whey, cornstarch, potatoes, molasses, and the like. In forming lactic acid-based polymers, the lactic acid is first oligomerized then depolymerized to form lactide monomer which is then polymerized to high molecular weight polylactide or polylactic acid (PLA). According to current commercial processes, the lactide is processed so as to obtain high purity L-lactide, which is then subjected to a ring-opening polymerization process to form the product crystalline polymers. Polymers formed to date derived from D-lactide and meso-lactide monomers have been shown to be more amorphous, and thus D- and meso-lactide polymers have not been considered to be particularly useful for commercial applications, and particularly in applications in which high semi-crystalline thermoplastic polymer performance characteristics (e.g., high strength, high glass transition temperature ($T_g$), etc.) are required.

The polymers obtained to date including renewable resource-derived materials tend to have very limited applications, though some polylactide products based upon L-lactide alone such as those commercialized by Natureworks, LLC are beginning to show possible application in some fiber and film technologies. Attempts to include materials derived from renewable resources in broader-based applications have been limited due to cost considerations as well as due to loss of critical properties of the polymeric product upon replacement of the traditional components with the renewable resource derived intermediates. For example, the hydrolytic stability of polymers formed from renewable resources is often such that they degrade too quickly during use, rendering them unsuitable for many applications. Other problems encountered include unacceptable increase in the viscosity of resins upon alteration or removal of the traditional components and unacceptable loss of mechanical and thermal properties, e.g., glass transition temperature, modulus, and strength characteristics, upon inclusion of the renewable resource derived components.

What is needed in the art are polymeric materials that can include monomers, oligomers, polymer blocks, and even entire polymers derived from renewable resources. Moreover, what is needed in the art are polymeric materials incorporating these components that can exhibit qualities suitable for use in applications currently employing materials derived exclusively from non-renewable resources such as traditional vinyl ester-styrene resins.

SUMMARY

In one embodiment, thermoset resin are disclosed herein. More specifically, a thermoset resin as disclosed herein can include an intermediate derived from a renewable resource. More specifically, the intermediate can include a reactive terminal group that can react with other intermediates or other materials during formation of a crosslinked thermoset network. The intermediate can include the reaction product of a first material that has been derived from the renewable resource and a second material that includes the reactive terminal group. Thermoset resins as described herein can be, for example, vinyl ester resins, epoxy resins, unsaturated polyester resins, polyurethane resins, and the like.

In one preferred embodiment, the intermediate can be formed from lactide. Moreover, the lactide used to form the reactive intermediate can be, for example, a racemic lactide.

In one particular embodiment, the thermoset resin can be a vinyl ester styrene resin (VESR). Beneficially, VESRs as described herein can include less styrene than previously known VESRs, for instance, less than 40%, while still exhibiting high quality characteristics.

The present disclosure is also directed to methods of forming thermoset networks. A method can include, for instance, providing a composition including an intermediate as described herein and crosslinking the composition to form a thermoset network. The method can also include forming one or more of the materials to be included in the network. For instance, the method can include forming the intermediate by a process that includes reacting the various materials with one another. In one embodiment, a method can also include forming the materials that can then be reacted to form the intermediate. For instance, a method can include forming the second material that can provide the terminal reactive group to the intermediate.

BRIEF DESCRIPTION OF THE FIGURES

A full and enabling disclosure, including the best mode, to one of ordinary skill in the art, is set forth more particularly in the remainder of the specification, including reference to the accompanying figures, in which:

FIG. 14 tabulates several characteristics that were determined for various VESRs of the present invention.

DETAILED DESCRIPTION

Figure 1:
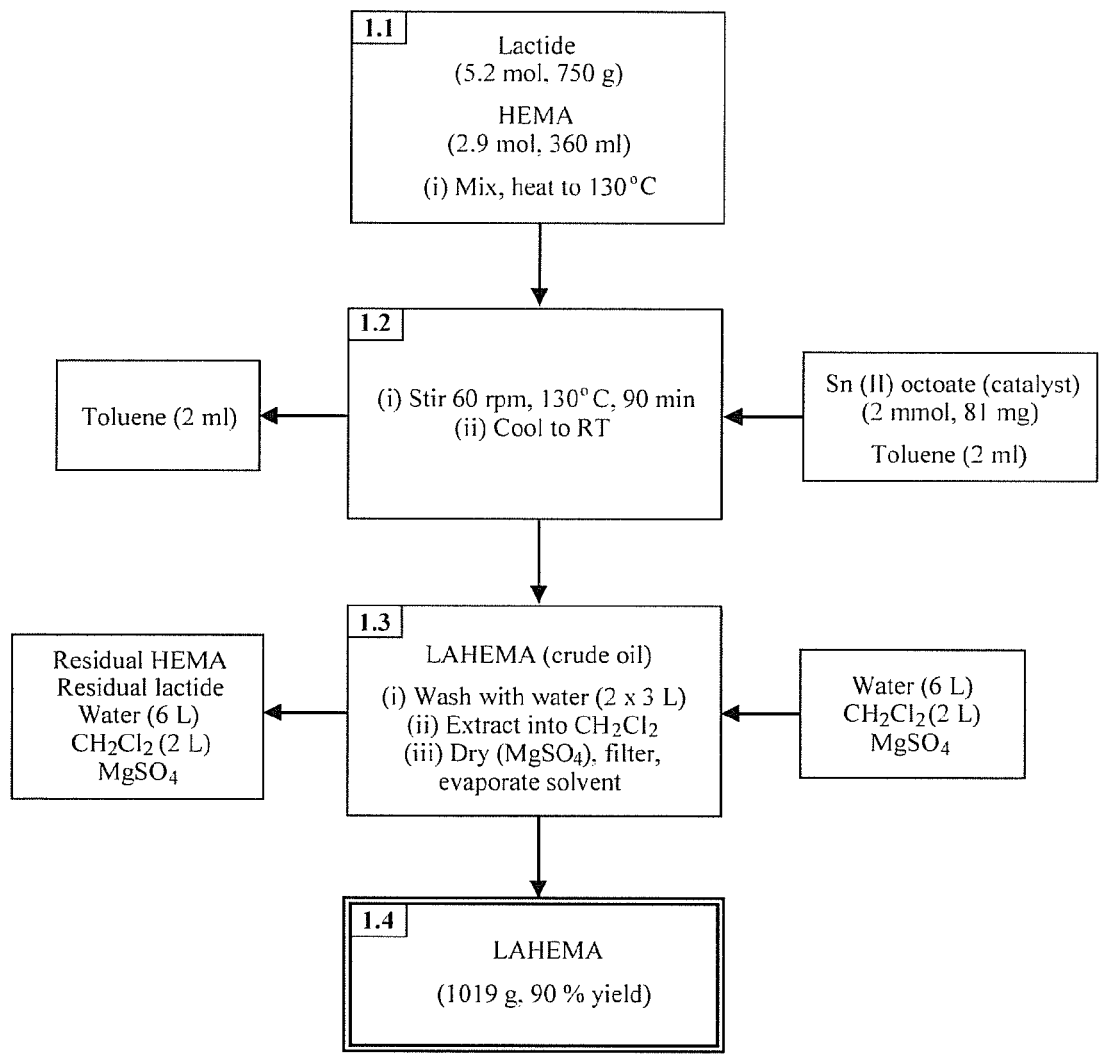
FIG. 1 is a flow diagram for a formation process for an exemplary lactide-based intermediate as herein disclosed.

Reference will now be made in detail to various embodiments of the disclosed subject matter, one or more examples of which are set forth below. Each embodiment is provided by way of explanation, not limitation of the disclosure. In fact, it will be apparent to those skilled in the art that various modifications and variations may be made without departing from the scope or spirit of the disclosure. For instance, features illustrated or described as part of one embodiment, may be used with another embodiment to yield a still further embodiment. Thus, it is intended that the present disclosure cover such modifications and variations as come within the scope of the appended claims and their equivalents.

In general, the subject matter of the present disclosure is directed to polymeric materials and processes for producing the disclosed materials. More specifically, the polymers of the disclosed polymeric materials can be thermoset resins and crosslinked thermoset networks polymerized from reactive intermediates, e.g., monomers, oligomers, and/or polymeric blocks, at least a portion of which are derived from renewable resources. Production and use of the disclosed polymers and intermediates can reduce problems associated with previously known polymers formed entirely form non-renewable resources, including environmental problems faced while obtaining the raw materials and during production of the polymers, as well as problems associated with the use and eventual disposal of the materials.

In addition, the presently disclosed materials can meet or exceed legal standards directed at curtailing the use of non-renewable resources. For example, the 2003 U.S. EPA requirements for the National Emission Standards for Hazardous Air Pollutants for boat manufacturing as well as California state regulations for volatile organic compounds (VOC) regulate the styrene content of vinyl ester-styrene resins (VESRs) to be no greater than 35%. Globally, regulations limiting VOC levels in resins, such as styrene content in VESR, are also becoming more prevalent. Moreover, even beyond the legal requirements directed to formation and utilization of non-renewable resource-based materials, replacement of traditional materials with materials formed from renewable resources will become necessary as fossil fuel reserves become depleted.

The disclosed polymeric materials can exhibit equivalent or even improved product characteristics as compared to polymeric materials currently in use that are completely derived from non-renewable resources. For example, the disclosed polymers can exhibit physical characteristics such as resin viscosity, glass transition temperature ($T_g$) and strength and hydrolytic characteristics so as to be suitable for use in a wide variety of commercial applications. In one embodiment, the polymers of the present invention may be utilized in composites and applications currently reserved for more traditional polymers, including traditional thermoset resins such as vinyl ester resins (VER), epoxy resins (ER), unsaturated polyester resins (UPR), and polyurethanes (PU) as well as these and other traditional thermoset resins commonly used in combination with activated olefin monomers such as styrene. As used herein, the term "thermoset resin" generally refers to a reactive formulation capable of forming a cross-linked thermoset network. Typically, a thermoset resin can include any amount of cross-linking reactivity, from no cross-linking at all up to a cross-link density of about 95%, or in some embodiments, even higher, up to a cross-link density of about 99%. For instance, a thermoset resin can include one or more monomers, oligomers, or polymers, optionally including any desired additives (e.g., fillers and the like), which, upon crosslink initiation, can polymerize to form a crosslinked thermoset network.

In one embodiment, the disclosed polymers (e.g., crosslinked thermoset networks) can be polymerized from intermediates derived from lactic acid. According to this particular embodiment, lactic acid-based reactive intermediates can be formed via a ring-opening polymerization reaction between lactide and one or more additional reactants. The lactic acid-based reactive intermediates can then be polymerized, optionally with additional components, to form renewable resource-based polymers.

The chiral carbon atom in the lactic acid structure results in the three stereoisomers of lactide, shown below:

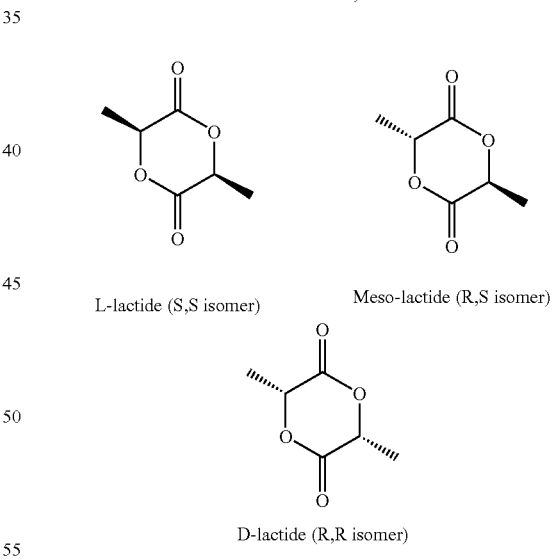

L-lactide (S,S isomer)  Meso-lactide (R,S isomer)

D-lactide (R,R isomer)

According to the disclosed processes, either racemic mixtures or pure enantiomers of lactide may be utilized in forming LA-based intermediates. In one embodiment, a racemic mixture of L- and D-lactide with or without the presence of meso-lactide may be preferred due to economics, though this is not a requirement of the invention. Surprisingly, polymers polymerized from disclosed reactive intermediates that have been formed from racemic lactide as well as those formed from meso- or D-lactide can exhibit high performance characteristics previously shown only by polymers formed exclusively from non-renewable resource derived materials.

Accordingly, the exclusive use of L-lactide is not a requirement of the presently disclosed processes and as such, the disclosed lactic-acid based reactive intermediates and the polymers formed therefrom can be more economical than previously known lactic acid-based polymers and intermediates formed exclusively from L-lactide.

Currently, racemic lactide, and in particular that produced as a by-product of the L-lactide manufacturing process, is considered to be a low value waste-stream. The present invention can not only utilize such racemic lactide but can also add value to current processes by eliminating the stereochemical requirement in processes dedicated to the manufacture of pure L-lactide.

In one embodiment, a reactive intermediate can be formed via complexation of lactide monomer (LA) with hydroxyethyl methacrylate (HEMA). For example, LA can be reacted with HEMA in the presence of a suitable catalyst to form a reactive methacrylate intermediate (LAHEMA) according to the following reaction scheme:

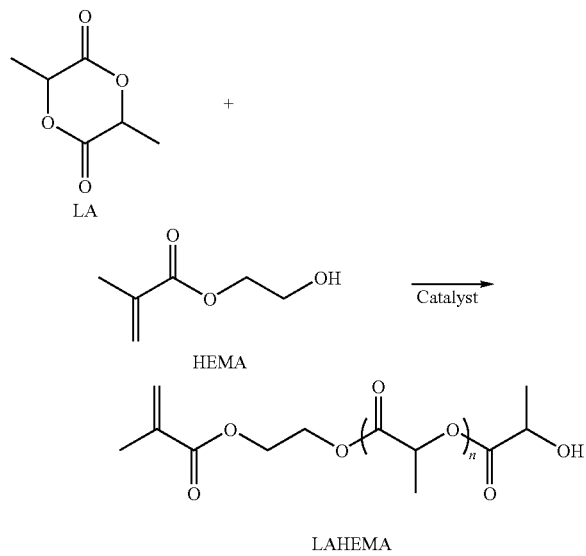

The intermediate formation processes described herein, such as the LAHEMA process described above, can be carried out in the presence of a suitable catalyst at elevated heat and/or pressure conditions. In general, the catalyst can be any compound or composition that is known to catalyze the polymerization of lactide. Such catalysts are well known, and include alkyl lithium salts and the like, stannous and aluminum catalysts such as stannous octoate, aluminum isopropoxide, and the like, and certain rare earth metal compounds as described in U.S. Pat. No. 5,028,667, which is incorporated herein by reference. The particular amount of catalyst used can vary generally depending on the catalytic activity of the catalyst, as well as the temperature of the process and the formation rate desired. Typical catalyst concentrations include molar ratios of lactide to catalyst of from about 10:1 to about 100,000:1, and in one embodiment from about 2,000:1 to about 10,000:1.

According to one embodiment of the process, the catalyst can be distributed in the starting lactide monomer material. If a solid, the catalyst can have a relatively small particle size. In one embodiment, the catalyst can be added to a monomer solution as a dilute solution in an inert solvent, thereby facilitating handling of the catalyst and its even mixing throughout the monomer solution. In those embodiments in which the catalyst is a toxic material, the process can also include steps to remove catalyst from the mixture following the polymerization reaction, for instance one or more leaching steps.

In one embodiment, the intermediate formation process can be carried out at elevated temperature, for example, between about 95° C. and about 200° C., or in one embodiment between about 110° C. and about 170° C., and in another embodiment between about 140° C. and about 160° C.

According to one particular embodiment particular characteristics of the reactive intermediate such as size can be predetermined and controlled via the particular parameters of the intermediate formation process. For example, in one embodiment, LAHEMA oligomers can be formed with a predetermined number of repeating monomer units. For instance, LAHEMA oligomers with controlled size of n=2 up to n=7 can be obtained through variation of the ratio of the lactide monomer to the HEMA monomer provided to the formation process. Table 1, below, summarizes the relationship between starting ratio of LA to HEMA and size of LAHEMA oligomers that may be formed by the complexation process.

TABLE 1

| LA:HEMA molar ratio | | |
|---|---|---|
| LA | HEMA | n |
| 1 | 1 | 1 |
| 2 | 1 | 3 |
| 3 | 1 | 5 |
| 4 | 1 | 7 |
| 5 | 1 | 9 |

In one embodiment, the LA-based intermediates disclosed herein can be formed via direct reaction of the lactide with a secondary material that is commercially available. For example, when considering the formation of the LAHEMA intermediate described above, commercially available lactide monomer and HEMA monomer starting materials can be reacted via a scheme such as that illustrated in FIG. 1. In the illustrated exemplary process of FIG. 1, LAHEMA oligomer of n=2, 3 can be formed utilizing lactide monomer and HEMA monomer as the starting materials, and in one particular embodiment, commercially available monomers may be used as the starting materials.

Figure 2:
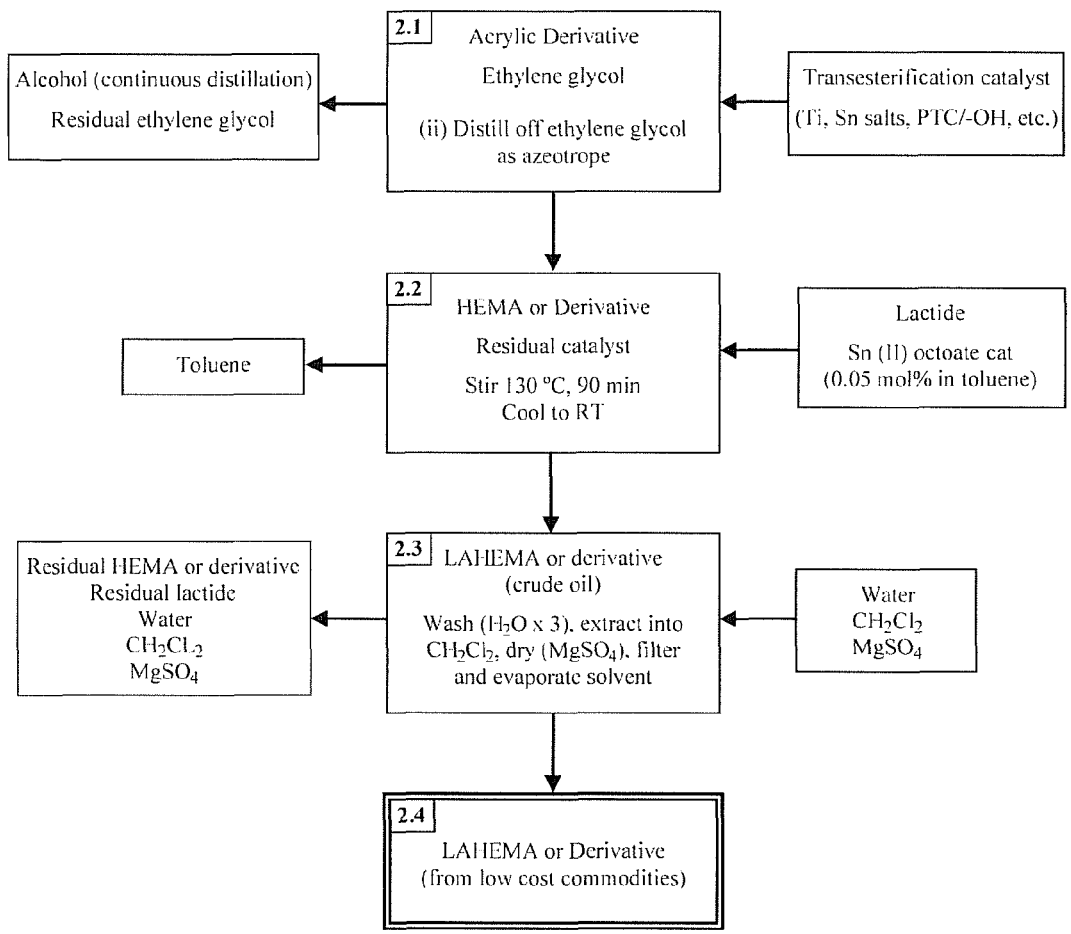
FIG. 2 is a flow diagram for an alternative formation process for an exemplary lactide-based intermediate as herein disclosed.

In an alternative process, formation of the lactide monomer and/or the secondary material can be an integral part of a intermediate formation process. For example, in one embodiment, HEMA can be initially produced in situ via transesterification or condensation of acrylic acid and/or ester derivatives with ethylene glycol using catalysts well known to those of skill in the art. According to this embodiment, the preparation of HEMA ready for addition and oligomerization with lactide can be an integral part of the formation process. One embodiment of such a process is illustrated in FIG. 2.

The LA-based intermediate of the present invention is not limited to the methacrylate intermediate described above. In other embodiments, the lactide-based intermediate can be functionalized to include additional or alternative functionality able to undergo polymerization. In general, the secondary material to be combined with lactide can contain two functional groups, A and B, that can be the same or different.

One of these groups (A) can initiate lactide monomer polymerization (via e.g., R—OH or hydroxyl functional group) and the other (B) (e.g., carbon-carbon double bond, acrylate, vinyl, vinyl ether, etc.) can be reserved in the intermediate and used for incorporation into another resin or final product.

Functional group A can be a nucleophile able to react with lactide and in one preferred embodiment can be hydroxyl. This is not a requirement of the invention however, and functional group A can alternatively be thiol, carboxylic acid, amino, amide, alkyl lithium, alkyl magnesium halide, or any other nucleophilic functional group able to react with lactide.

Functional group B can be any polymerizable group able to undergo polymerization with other monomers or oligomers through chain growth or step growth addition and/or condensation mechanisms. In general, group B functionalities can include: carbon-carbon double bonds or olefins, methacrylate, acrylate, styrenic, vinyl, vinyl ether, vinyl ester, vinyl nitrile, amines, phenolics, isocyantes, cyanate esters, epoxy, and carbonate carbon-carbon double bonds containing halogens or any of the above.

In one embodiment, lactide monomer can be reacted with dihydroxypropylmethacrylate, also known as glycerol monomethacrylate (GMMA). GMMA has been found useful in many known processes as it can successfully bridge epoxy chemistry with acrylic functionality. The complexation of LA with GMMA can provide a methacrylic intermediate including two oligo-lactide groups according to the following reaction scheme:

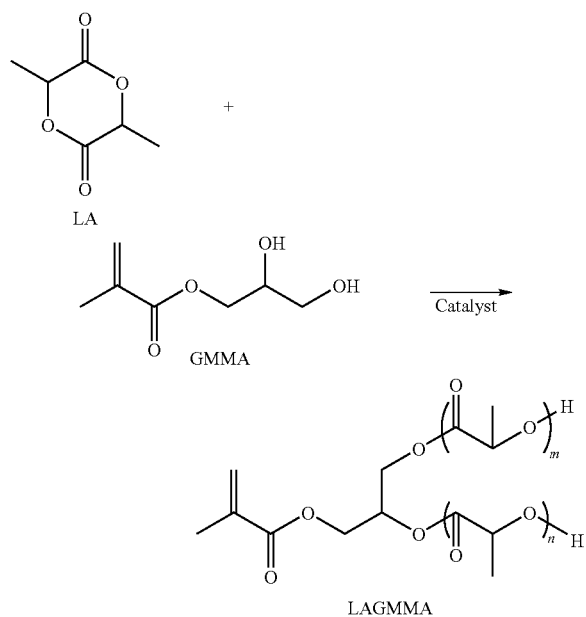

In one embodiment, an intermediate of the present invention can be further derivatized, prior to a polymerization process. For example, in one embodiment, a lactide-based intermediate, such as the LAHEMA or the LAGMMA intermediates described above can be further derivatized to form additional or alternative functionality on the intermediate.

For example, in one embodiment, LAHEMA can be further processed prior to polymerization to form a bis-acrylate intermediate. For instance, LAHEMA oligomer can be further derivatized via reaction with a suitable acrylate, for instance via reaction with acryloyl chloride, to form a bis-acrylate intermediate (LAHEMA-Ac). Such an intermediate can be utilized, for example, for modification of characteristics of the product polymers such as the $T_g$ of the product polymer including the residue of the bis-acrylate intermediate.

In another embodiment, an intermediate as disclosed herein can include materials derived from sorbitol. Sorbitol is a white, sweetish, crystalline alcohol, $C_6H_8(OH)_6$, that is naturally produced in various berries and fruits. Intermediates of the present invention can be formed via reaction of isosorbide (commercially prepared from sorbitol) with secondary materials. For example, in one embodiment, an intermediate can be formed via reaction of isosorbide with an acrylate, acid, amide, or the like to form a reactive intermediate for a polymerization reaction.

In one particular embodiment, acrylated or methacrylated isosorbide can be synthesized by reaction of isosorbide with acyl chloride or glycidyl methacrylate. The resulting methacrylated or acrylated isosorbide can be copolymerized/crosslinked with other intermediates as described herein, or alternatively with other traditional materials as are known in the art to form novel, renewable resource derived polymers. For example in formation of vinyl ester resins as further described below.

Other reactive intermediates can include those formed from 3-hydroxypropionic acid (3HP). 3HP is a commercially available monomeric building block that has been developed by the Cargill Corporation through an integration of fermentation and chemical processing of naturally derived glucose.

Figure 3:
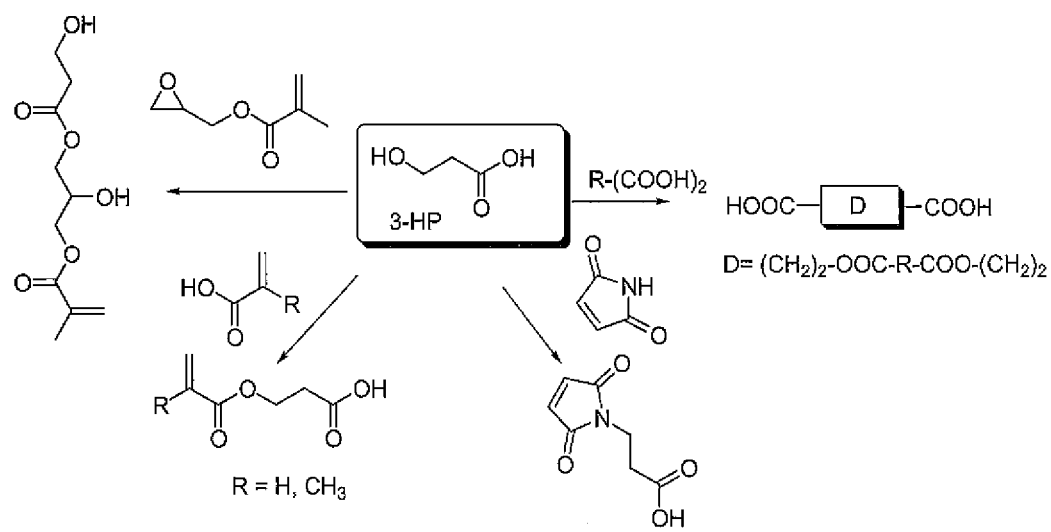
FIG. 3 illustrates exemplary reaction schemes for formation of several reactive intermediates formed from 3-hydroxypriopionic acid (3HP) that can be derived from natural carbohydrates.

FIG. 3 illustrates several reaction schemes utilizing 3HP as a starting material for forming exemplary reactive intermediates. For example, the renewable resource derived starting material can be functionalized via reaction with polyols, acrylates, methacrylates, aliphatic diacids, maleimides, and the like to form reactive intermediates.

Reactive intermediates as described herein can be copolymerized with other materials to form renewable resource-derived polymers. For example, reactive intermediates disclosed herein can be copolymerized with each other and/or with more traditional materials including, for example, reactive aromatic or aliphatic intermediates to form polymers.

In one embodiment, reactive intermediates derived from renewable resources can be combined with one or more additional materials to form a crosslinkable resin composition. For example, a reactive intermediate as described herein can be compounded with a second reactive material monomer, oligomer, or polymer to form a composition. Exemplary secondary materials can include, for example, traditional thermoset resins such as vinyl ester resins, bisepoxides, unsaturated polyesters, diacids, diisocyanates, and the like. Upon polymerization, the intermediate and the second material can copolymerize to form a thermoset crosslinked network.

In one particular embodiment, disclosed reactive intermediates can copolymerized with a vinyl ester, for instance a commercially available vinyl ester as is generally known in the art, to form a cross-linked vinyl ester resin (VER). For example, the reactive intermediate LAHEMA, described above, can be copolymerized with a commercially available vinyl ester, such as Derakane™ (available from the Ashland Corporation), and with styrene according to a standard vinyl ester-styrene resin (VESR) formation process. In one embodiment, VESR thus formed can include less styrene than the more traditional VESRs. Moreover, the disclosed VESRs can be formed with no loss in physical properties as compared to traditional VESRs that include a higher percentages of styrene.

Traditional VESRs are generally formed to include approximately 35 wt % to about 45 wt % styrene. Through inclusion of reactive intermediates as described herein, the styrene content of the disclosed VESRs can be less than those of previously known resins displaying similar physical characteristics. For example, in one embodiment, the VESRs as described herein can include less than about 40% styrene by weight of the resin, or even less in other embodiments. For example, VESRs as described herein can include less than about 35 wt % styrene, or less than about 30 wt % in other embodiments. In one embodiment, the VESRs described herein can include about 25 wt % styrene, or about 20 wt % styrene in another embodiment.

In addition, the disclosed resins can include a predetermined amount of a reactive intermediate as described above. For example, VESRs of the present invention can include up to about 40 wt % LAHEMA. In another embodiment, VESRs of the invention can include up to about 30 wt % LAHEMA, for instance between about 35 wt % and about 45 wt % in one embodiment, or between about 5 wt % and about 28 wt % LAHEMA in another embodiment.

In the past, attempts to decrease the amount of styrene in VESRs through replacement of the styrene with other materials has been not only expensive, but has also led to an unacceptable increase in resin viscosity, as well as loss of physical properties of the products. Presently disclosed VESRs can not only be economical, due at least in part to the possible utilization of racemic lactide as well as due to high yield of the reaction products, but also can exhibit physical characteristics, e.g., kinematic viscosity, $T_g$, flexural modulus, and the like, at least as good as that obtained for more traditional VESRs that include higher styrene content.

The VESRs as described herein can be formed to include other intermediates of the present invention, in addition to or alternative to LAHEMA. For instance, VESRs of the present invention can be polymerized from the previously described acrylated LAHEMA, LAGMMA, reactive isosorbide intermediates, or reactive 3HP intermediates, either alone or in combination with each other and/or LAHEMA. For example, inclusion of an amount of LAHEMA-Ac in conjunction with LAHEMA in forming the disclosed VESRs can be utilized to modify and control $T_g$ of the product resin.

It should be understood that VERs of the present disclosure are not limited to VESRs. In particular, VERs of the present disclosure encompass any VER formed according to a polymerization process in which one or more reactive intermediates as herein described have been polymerized, e.g., crosslinked, with one or more vinyl esters, with or without additional materials, such as styrene, included in the reactive resin or in the product polymer (e.g., the crosslinked thermoset network).

Figure 4:
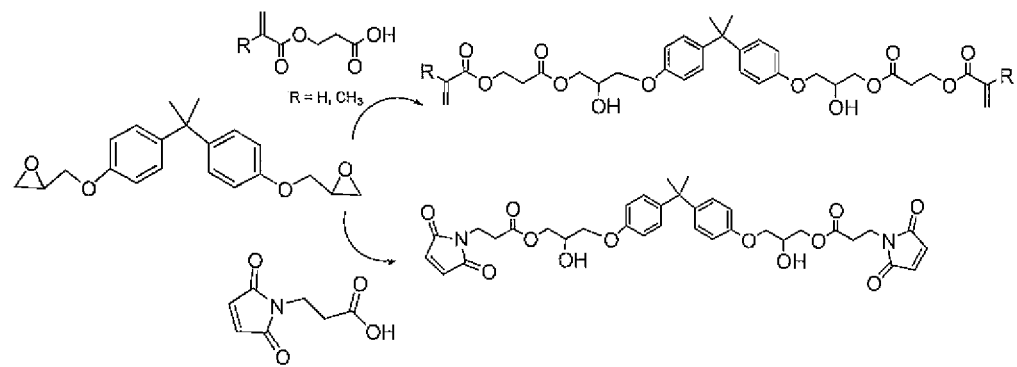
FIG. 4 illustrates reactions schemes for forming vinyl ester resins (VERs) via polymerization of a vinyl ester with exemplary reactive intermediates as herein disclosed.

For example, exemplary reaction schemes for forming two exemplary VERs including intermediates formed of renewable resources as described herein are illustrated in FIG. 4. As can be seen, these particular VERs can be formed via polymerization of a vinyl ester such as the illustrated Derakane™ with reactive intermediates derived from 3HP.

Other polymers encompassed by the present invention can include other commodity thermosets such as those formed from epoxy resins, unsaturated polyester resins, and polyurethane resins.

In one embodiment, reactive intermediates as described herein can be copolymerized with a methacrylate, for example, a glycidal methacrylate (GMA) to form an epoxy thermoset. For example, LAHEMA and/or LAHEMA derivatives (e.g., LAHEMA-Ac, etc.) can be copolymerized with GMA according to the following scheme:

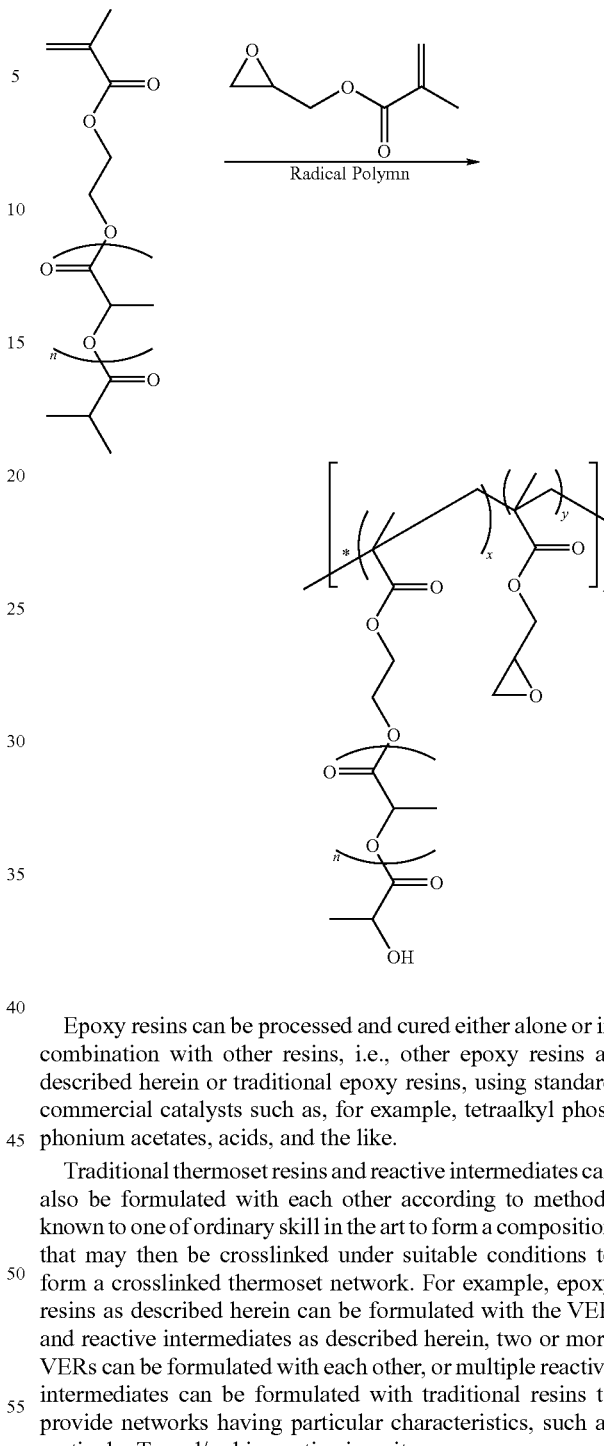

Epoxy resins can be processed and cured either alone or in combination with other resins, i.e., other epoxy resins as described herein or traditional epoxy resins, using standard commercial catalysts such as, for example, tetraalkyl phosphonium acetates, acids, and the like.

Traditional thermoset resins and reactive intermediates can also be formulated with each other according to methods known to one of ordinary skill in the art to form a composition that may then be crosslinked under suitable conditions to form a crosslinked thermoset network. For example, epoxy resins as described herein can be formulated with the VER and reactive intermediates as described herein, two or more VERs can be formulated with each other, or multiple reactive intermediates can be formulated with traditional resins to provide networks having particular characteristics, such as particular $T_g$ and/or kinematic viscosity.

As can be seen with reference to FIG. 3, among the reactive intermediates encompassed by the present disclosure are included diols and diacids prepared from renewable 3HP. Similarly, other reactive intermediates derived from renewable resources can be functionalized to include hydroxyl or acid reactivity. According to one embodiment, novel polyurethanes derived from renewable resources can be prepared via reaction of commercial di-isocyanates with the disclosed reactive intermediates. For instance, lactide can be functionalized with polyethylene glycol and the resultant hydroxyl reactive intermediate can be polymerized with an aliphatic or aromatic di-isocyanate to produce a polyurethane.

As is generally known in the art, one of the most useful methods for producing polyamides is by the reaction of diisocyanates with dicarboxylic acids. Specifically, the carboxylic acid adds across the carbon-nitrogen double bond to form polymeric anhydride and upon decarboxylation forms the polyamide. The evolved carbon dioxide can be trapped in the form of bubbles in the viscous medium and thus foams can be produced which can be used, e.g., in cushions or other upholstery applications. According to one embodiment, diacid reactive intermediates formed of renewable resources, for example, those prepared from 3HP, lactide, or isosorbide, can be reacted with isocyanates according to this well known reaction scheme to produce polyamides and polyamide/urethane copolymers.

The acrylic intermediates described herein are also amenable to reaction and crosslinking with unsaturated polyester resins (UPR) based on malonic or other unsaturated diacid monomers.

As mentioned above, the reactive intermediates as described herein can be combined with other reactive materials that can include terminal reactive groups capable of polymerizing with the reactive intermediates described herein. For example, materials including terminal functionality such as epoxy, isocyanate, acid, carbon-carbon double bonds (unsaturated hydrocarbon linkages), or any combination thereof, can be combined with the reactive intermediates to form a resin that can be further reacted (e.g., crosslinked) to form a thermoset network. For instance, other reactive materials that can be formulated with the reactive intermediates can include, e.g., vinyl ester resins, diisocyanates, and the like to form a crosslinkable composition. Resin formulations are not limited to these constituents, however. Other desired constituents can also be added to the blend that may enhance or improve characteristics of the resins and/or the cured networks. For example, initiators may be employed in some embodiments that enhance the functionality of the selected crosslinking technique. Thermal initiators, for instance, may be employed in certain embodiments, such as azo, peroxide, persulfate, and redox initiators. Photoinitiators may likewise be employed, such as substituted acetophenones, substituted alpha-ketols, substituted or unsubstituted benzoin ethers, aromatic sulfonyl chlorides, photoactive oximes, and the like.

In one embodiment, a resin including the reactive intermediates described herein can be combined with additional constituents via a suitable diluent. For instance, a monomeric reactant, such as styrene, can be combined with a resin including a reactive intermediate as described herein as a diluent prior to extrusion, molding, or any other desired processing prior to cure.

The crosslinkable composition can include other additives as are generally known in the art. For example, the crosslinkable composition can include suitable coloring agents, such as dyes or other pigments. Other additives that can be combined with the mixture can include, for example, one or more of anti-static agents, antioxidant agents, antimicrobial agents, adhesion agents, stabilizers, plasticizers, brightening compounds, clarifying agents, ultraviolet light stabilizing agents, nucleating agents, surface active agents, odor enhancing or preventative agents, light scattering agents, halogen scavengers, and the like.

Following formation, a resin including a reactive intermediate as described herein can be molded, shaped, or otherwise processed according to any known polymer processing technique. For instance, a resin can be provided to a molding process in liquid, powder or pellet form. Following or contemporaneous with formation, which can include processing via extrusion, injection molding, blow molding, and the like, as well as any combination thereof, the resin can be crosslinked to form a thermoset network.

Depending upon the nature of the materials of any specific embodiment, crosslink reactions may be initiated according to any suitable technique. By way of illustration only, thermoset networks may be cured via any of a variety of different crosslinking mechanisms such as thermal initiation (e.g., condensation reactions, addition reactions, etc.), electromagnetic radiation, and so forth. Some suitable examples of electromagnetic radiation that may be used in curing the thermoset networks may include, but are not limited to, electron beam radiation, natural and artificial radio isotopes (e.g., $\alpha$, $\beta$, and $\gamma$ rays), x-rays, neutron beams, positively-charged beams, laser beams, ultraviolet, etc. Electron beam radiation, for instance, involves the production of accelerated electrons by an electron beam device. Electron beam devices are generally well known in the art.

The present disclosure may be better understood with reference to the following Examples:

EXPERIMENTAL PROCEDURES

Polymerization products were characterized by in situ FTIR spectroscopy using the ASI Applied Systems 1000 reaction analysis system having attenuated total reflection (ATR) mid-infrared spectroscopy with a diamond composite insertion probe. This system provided the capability of recording an infrared spectrum of materials that were contacted with a chemically resistant probe.

Glass transition temperatures ($T_g$) of the networks were measured with a TA Instrument DSC Q1000 using Universal Analysis software for data acquisition and analysis. The samples were sealed in aluminum hermatic pans and heated from 25° C. to 250° C. at 5° C./min. Repeated scans were taken until the glass transition temperature stabilized.

Flexural properties for 2"×½"×⅛" specimens in the 3-point bending mode were obtained according to the test method ASTM D 790-03 using an Instron 5582 testing machine (crosshead motion rate of 15 inches min$^{-1}$).

Example 1

Lactide (obtained from Ortec, used as received) and HEMA (obtained from Acros, 98%, used as received) were mixed in various ratios and heated together without solvent to 130° C. to give a clear, colorless homogeneous mixture. Sn(Oct)$_2$ (obtained from Sigma, 95%, used as received) was added and the reaction mixture was stirred for 2 hours. A significant but manageable exotherm ensued upon initiation.

The LAHEMA product was then washed with water, dissolved in CH$_2$Cl$_2$ and dried, giving a clear colorless oil or waxy solid in excellent yields approaching 90% LAHEMA n=1-9.

Figure 5:
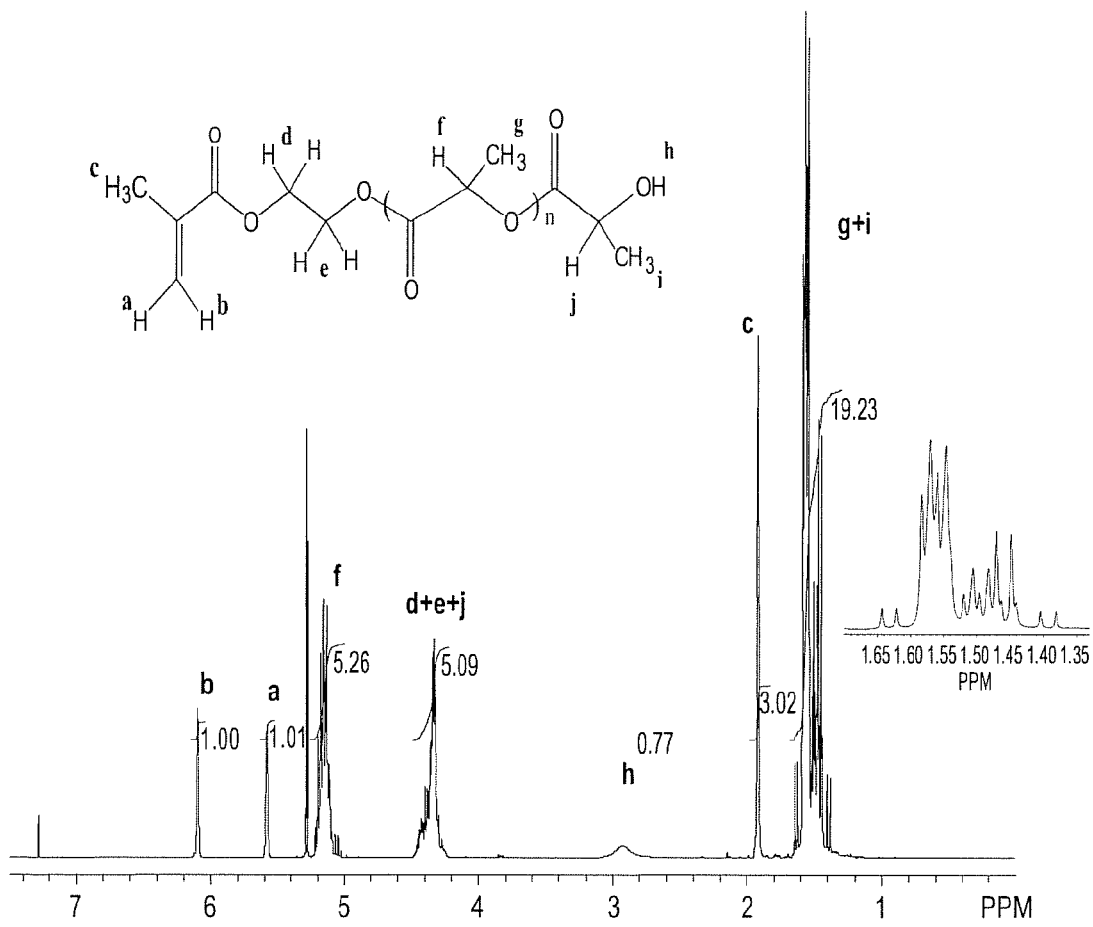
FIG. 5 illustrates the $^1H$ NMR spectrum of LAHEMA formed from starting materials provided with a lactide: HEMA molar ratio of 3:1.

By varying the molar ratio of LA monomer with HEMA monomer as shown above in Table 1, oligomers with controlled n=1 to n=9 were obtained. The products with n=1 appeared as a clear oil and the viscosity increased with increasing n. Products with n=9 existed as a waxy solid at room temperature. The structure was confirmed by $^1$H, $^{13}$C NMR and IR spectroscopy. FIG. 5 illustrates the $^1$H NMR spectrum of LAHEMA beginning from a lactide:HEMA molar ratio of 3:1.

From the $^1$H NMR spectrum of LAHEMA (FIG. 5), the degree of polymerization (n) was determined as followed:

$n=f/a$

The lactide to HEMA molar ratio (LA:HEMA) in LAHEMA was determined using the following methods:

| Method 1: | LA:HEMA = (n + 1)/2:1 |
| --- | --- |
| Method 2: | LA:HEMA = ((f + d + e + j) − (4*b))/2:1 |
| Method 3: | LA:HEMA = ((g + i)/6)/2:1 |
| Method 4: | LA:HEMA = (g + i)/(c*2):1 |

For example, by beginning with 3 moles of lactide to 1 mole of HEMA, the degree of polymerization was:

$n=5.3/1.0=5.3$

The lactide to HEMA molar ratio in LAHEMA was thus:

| Method 1: | LA:HEMA = (5.3 + 1)/2:1 = 3.2:1 |
| --- | --- |
| Method 2: | LA:HEMA = ((5.3 + 5.1) − (4*1.0))/2:1 = 3.2:1 |
| Method 3: | LA:HEMA = (19.23/6)/1.0:1 = 3.2:1 |
| Method 4: | LA:HEMA = 19.23/(3.02*2):1 = 3.2:1 |

Example 2

Terpolymer with acrylate functionality was formed via polymerization of lactide with GMA and 6F-bisphenol-A (Bis-A). The reaction was initially carried out at 110° C. with standard CE/KCl catalysts. Gellation occurred within 30 minutes indicating initiation of the acrylate group. The reaction was then modified slightly by adding hydroquinone to the reaction as an inhibitor. This method was successful and reproducible and $^1$H NMR analysis confirmed that the reaction was completed after 3 hrs.

The resin thus formed was cured with different percentages of LAHEMA using different catalyst systems. In one set of experiments, the resin mixture was cured at 120° C. with 1% of benzoyl peroxide (BPO). The mixtures were also cured with 1.5% methyl ethyl ketone peroxide (MEKP) and 0.5% Co-Nap system for 24 h at room temperature followed by 120° C. for 2 hrs. All reaction mixtures provided clear transparent products. The resulting products were analyzed by DSC.

Example 3

Vinyl Ester Resin Derakane™ 411-350 (45 wt % styrene) was obtained from The Dow Chemical Company and used as received for the control. Various formulations with 1.25 wt % methyl ethyl ketone peroxide (MEKP) and 0.30 wt % Cobalt Naphthenate (CoNap), were cured in Teflon molds at room temperature in air for 24 hours, and then post-cured at 120° C. in air for 2 hours. Formulation and cure conditions for control and experimental materials followed standard commercial protocols. All formulations are reported in the Figures as weight percentages of styrene-LAHEMA-VER, respectively.

The control Derakane™ was adjusted to 24-35 wt % styrene by removal of excess styrene under vacuum at 37° C.

LAHEMA formed as described above in Example 1 was reacted with acryloyl chloride to obtain the LAHEMA-Ac as transparent slightly yellow oil.

Vinyl ester-styrene resins with varying styrene contents (VER-Styrene) were formulated with LAHEMA, 0-28 wt % and with LAHEMA-Ac. These new resins were cured using the same conditions as for the control and yielded highly crosslinked networks with increasing $T_g$ with increasing LAHEMA-Ac (103-125° C. from 2-10%) as expected.

Figure 6A:
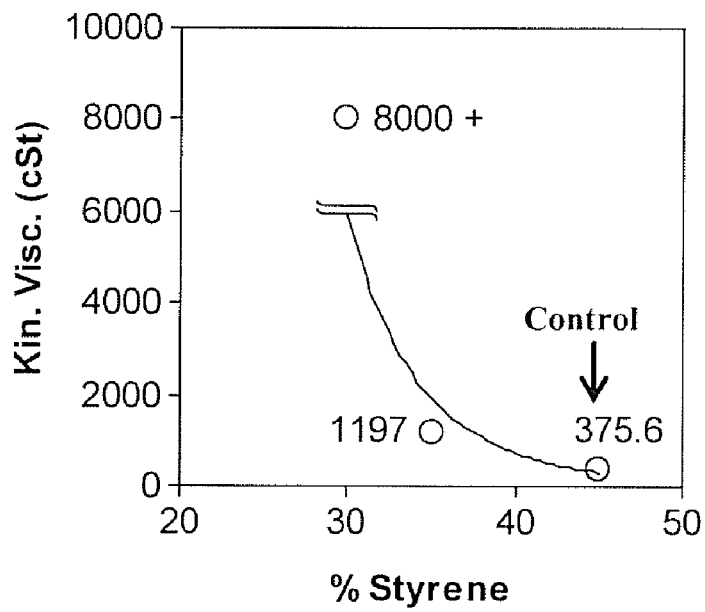
FIG. 6 graphically illustrates changes in kinematic viscosity of vinyl ester-styrene resins (VESRs) with decreasing styrene content for networks that do not include the reactive intermediates as described herein (FIG. 6A) and for networks that do include the reactive intermediates as described herein (FIG. 6B)
Figure 6B:
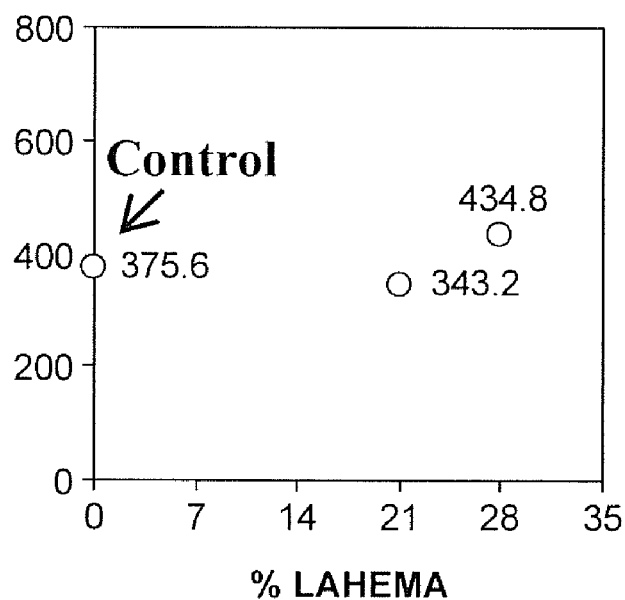

Formulation viscosity is a critical parameter for end use applications of vinyl ester resins. Previous attempts at styrene reduction or replacement have resulted in impractical viscosity increases; the excellent solvency of styrene is predictably difficult to overcome. This is evident from FIG. 6A which presents the viscosities of VE resins with different compositions of styrene (No LAHEMA). As the styrene wt % was reduced from 45% to 35%, the viscosity increased nearly 3 times and with a further decrease in styrene to 30 wt %, the viscosity changed radically to above 8000 centistokes (cSt). Viscosities higher than 8000 cSt could not be obtained due to instrument limitations. FIG. 6B displays the viscosity effects of replacing styrene with LAHEMA, keeping the vinyl ester resign ("VER") content at 42-44 wt %. The viscosity values are comparable and close to that of the control (Dow Derakane™ 411-350). This significant result indicates that the addition of 21 wt % or higher amount of LAHEMA allows the viscosities to be in the workable range as the present commercially available resins.

Figure 7:
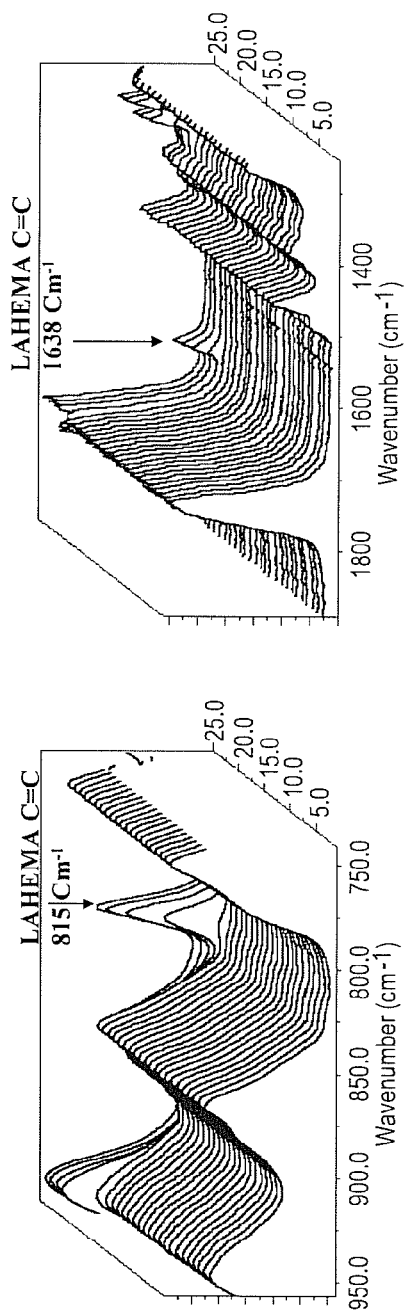
FIG. 7 illustrates ReactIR™ plots for (a) lactide/hydroxyethyl methacrylate co-oligomers (LAHEMA) and (b) VESR including 35% styrene/21% LAHEMA/44% vinyl ester cured with MEKP system.
Figure 7:
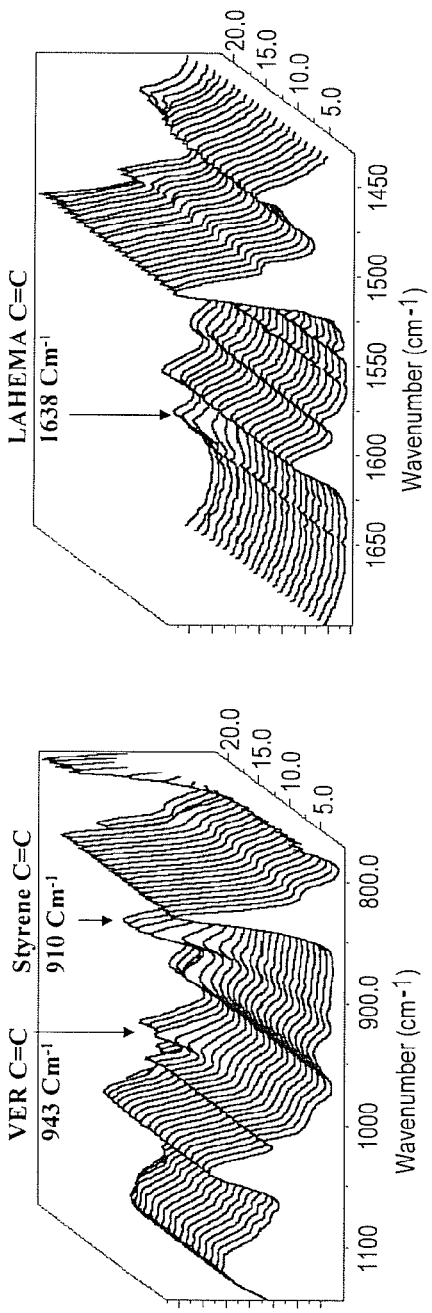

A typical ReactIR™ plot of the Derakane™ resins cured with LAHEMA in the presence of MEKP system is shown in FIG. 7 for 35% styrene/21% LAHEMA/44% VER (35-21-44). Under these conditions, LAHEMA was very reactive and comparable to the reactivity of styrene. The monomer consumption plot for various formulations of Derakane™ with LAHEMA is presented in FIG. 8.

Figure 8:
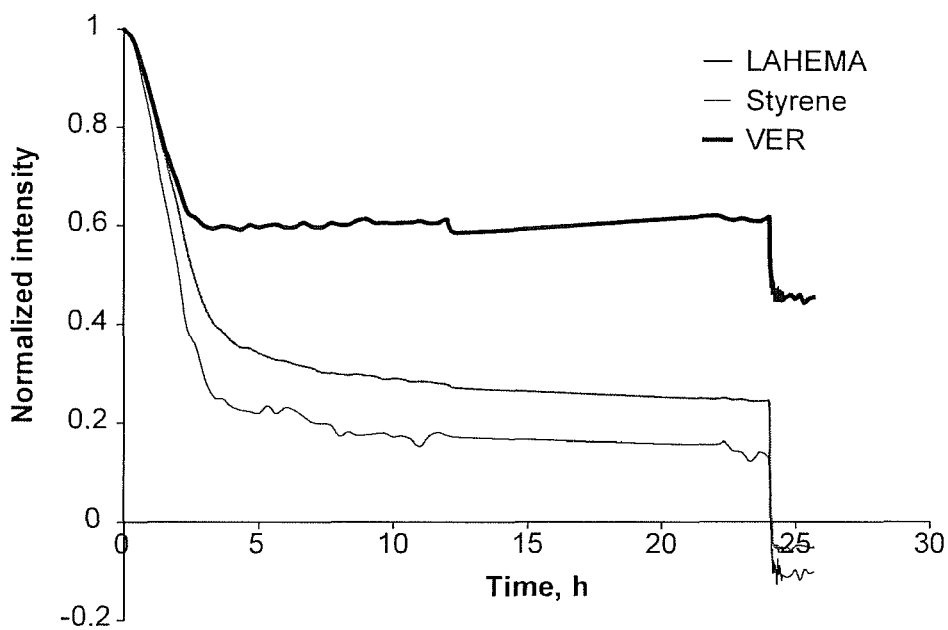
FIG. 8 illustrates the monomer consumption plot for a VESR including 35% styrene/21% LAHEMA/44% vinyl ester.

As shown in FIG. 8, LAHEMA is clearly consumed at the fastest rate at room temperature as similarly observed in all formulations tested. Furthermore, LAHEMA and styrene were consumed completely at competitive rates when the samples were heated to 120° C. for 2 h as shown at 24 h in FIG. 8. In all formulations, styrene and LAHEMA reacted faster than VER.

Figure 9A:
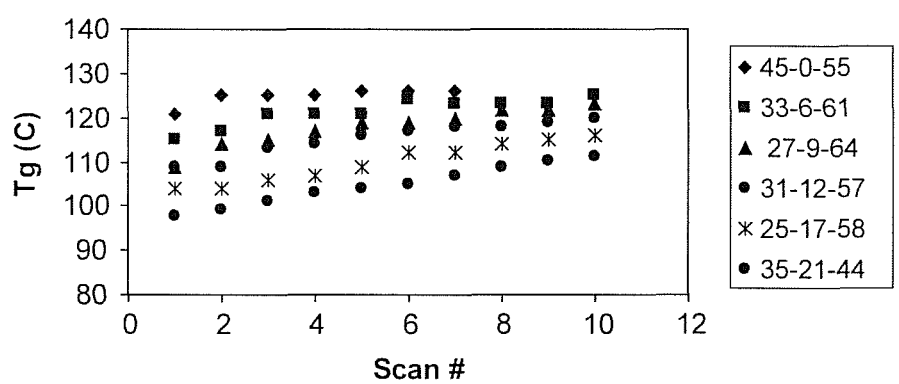
FIG. 9 illustrates $T_g$ vs. scan number by DSC for various styrene-LAHEMA-vinyl ester formulations (FIG. 9A) and the same for formulation including constant LAHEMA percentages (FIG. 9B)
Figure 9B:
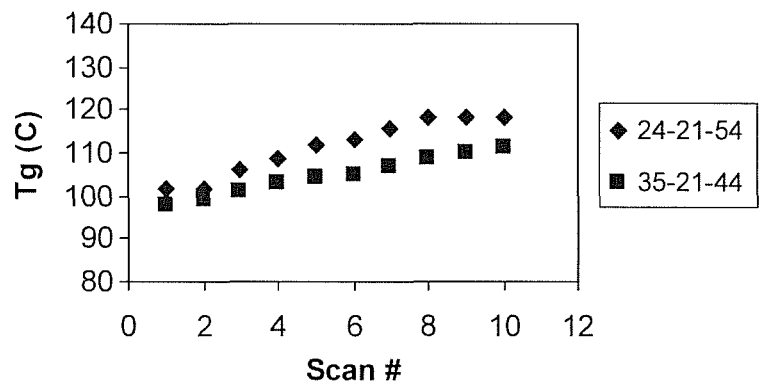
Figure 10:
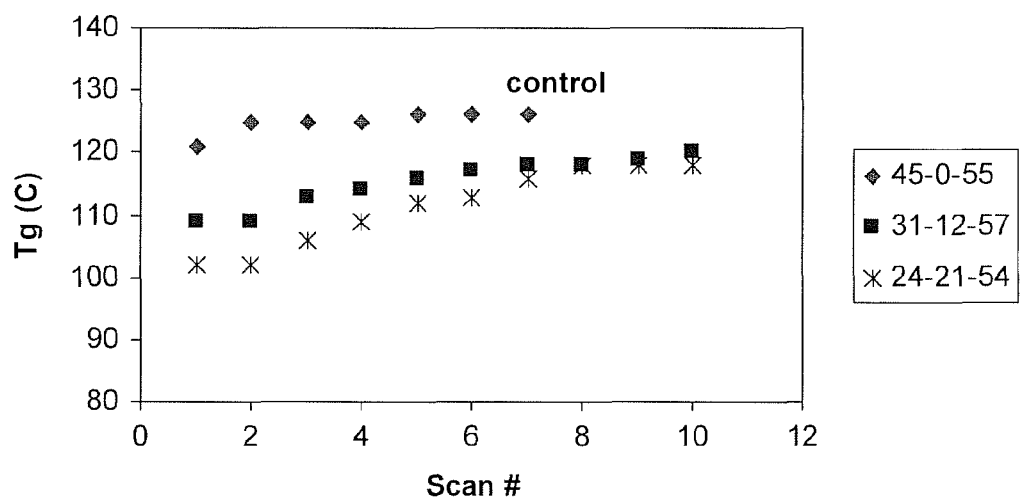
FIG. 10 illustrates $T_g$ vs. scan number by DSC for styrene-LAHEMA-vinyl ester formulations including statistically constant vinyl ester percentages.

Specimens prepared using different styrene contents in the vinyl ester-styrene resins that did not include LAHEMA exhibited $T_g$ ranging from 121-128° C. FIG. 9 shows the effect on $T_g$ when LAHEMA was used to partially replace styrene in the vinyl ester-styrene resins. As can be seen with reference to FIG. 9A, the $T_g$ of the networks only slightly decreased as LAHEMA content increased. When holding LAHEMA content constant at 21 wt %, the network with the lower styrene content was found to have a higher glass transition temperature (FIG. 9B) due to the higher crosslink density (i.e., more VER). FIG. 10 illustrates the effect with roughly constant VER content in the formulations where $T_g$ slightly decreases with increasing LAHEMA.

Figure 11:
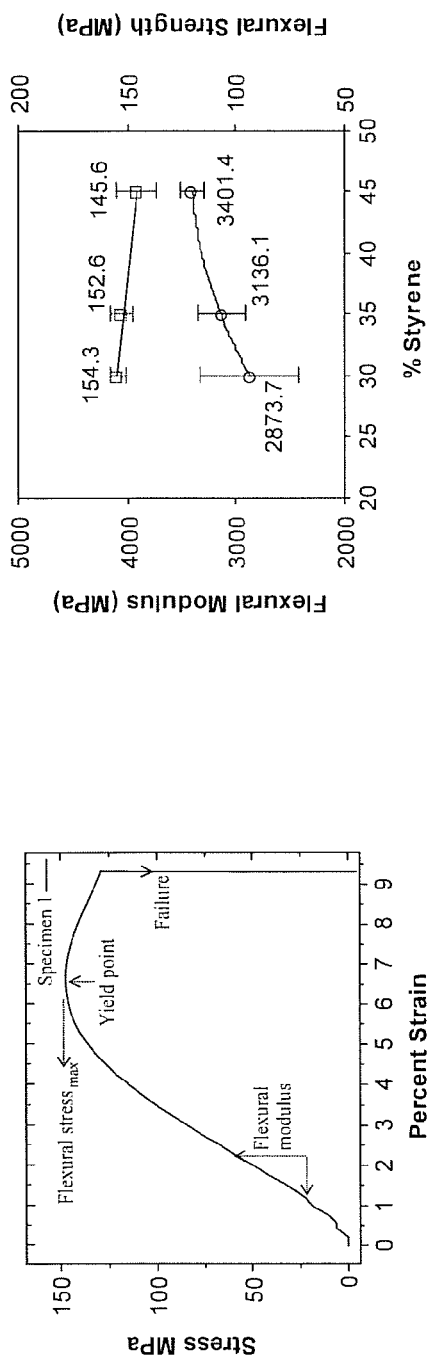
FIG. 11 illustrates typical VESR network stress/strain response (FIG. 11A) and flexural properties with varying styrene content (FIG. 11B) for traditional networks (i.e., no LAHEMA)

FIG. 11 shows a typical stress-strain response to the application of 3-point loading on the vinyl-ester resins; the flexural modulus was calculated as the slope of the linear stress-strain profile, and the flexural strength is the maximum stress that the sample can withstand before failure. FIG. 11 presents the flexural properties at different styrene compositions in the VER with no LAHEMA present. The modulus values decrease significantly with decreasing styrene as expected and previously reported.

Figure 12:
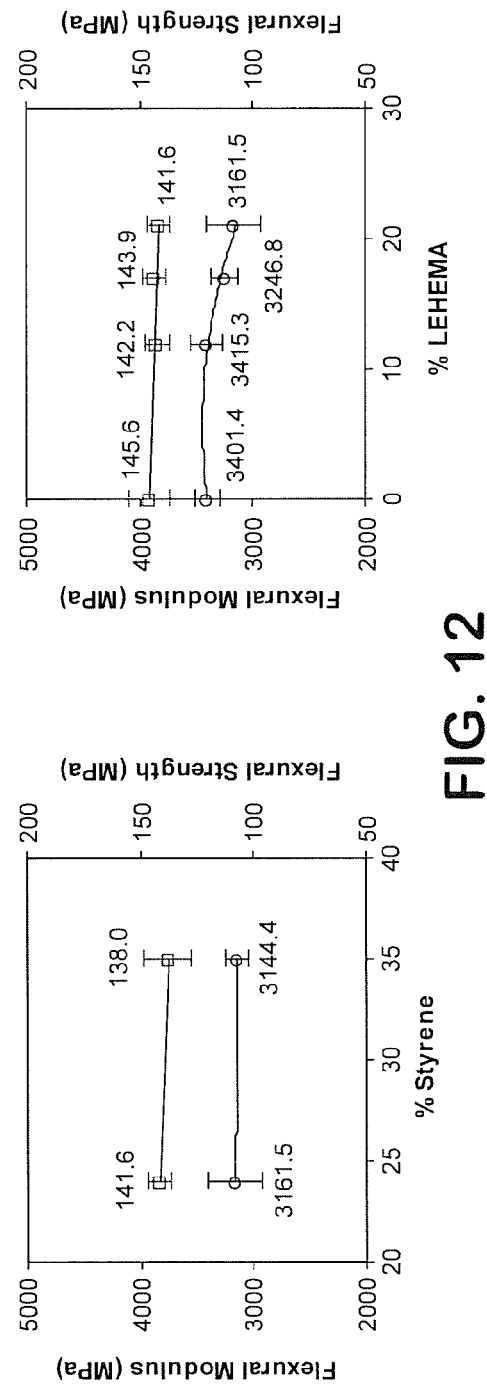
FIG. 12 illustrates VESR network stress/strain response and flexural properties with varying styrene content (FIG. 12A) and with varying LAHEMA content (FIG. 12B) for VESR networks of the present invention.

FIG. 12 illustrates the flexural properties of the VER when LAHEMA is added at 21 wt %. As can be seen, both the modulus and strength values remained essentially constant as styrene decreased, indicating that the addition of LAHEMA not only maintains good VER network mechanical properties but appears to compensate for the loss of styrene when held constant. FIG. 12 illustrates the effect of replacing styrene with LAHEMA, keeping the VER in the range of 54-58 wt %.

Degradation tests were conducted using boiling water as it is the more commercially prevalent degradation test. Networks made from the commercial vinyl ester-styrene resin before and after styrene replacement with LAHEMA were immersed in boiling distilled water (100° C.) for 2 hours to determine the relative rate of absorption, the percentage of soluble matter lost according to ASTM D570-98, and effect on mechanical properties. The boiling water temperature employed in this study was more severe than the 80° C. typically used.

Figure 13:
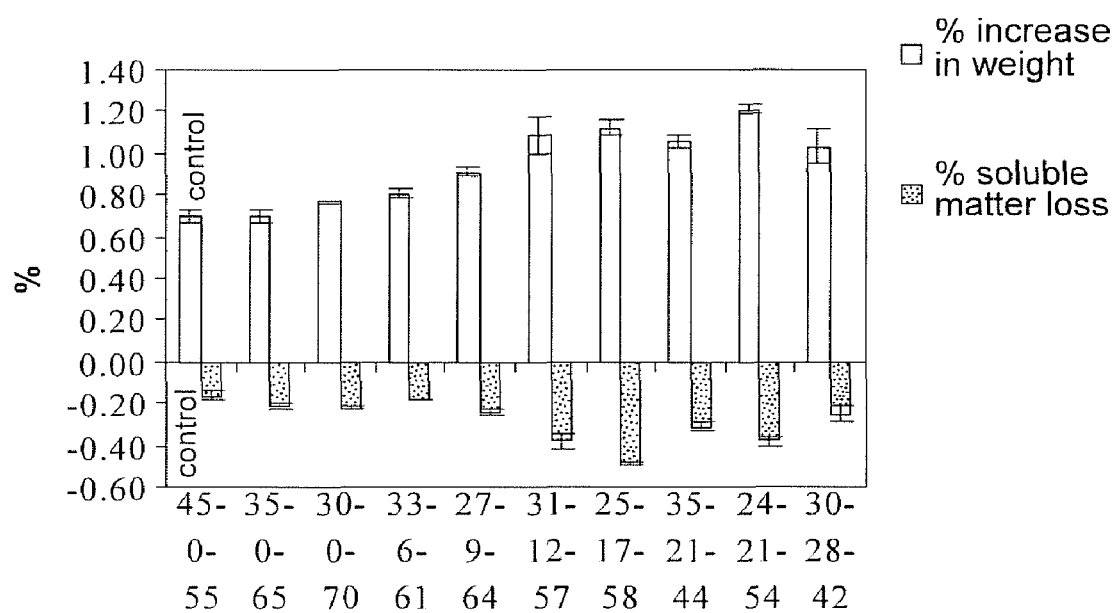
FIG. 13 illustrates the percentage increase in weight and soluble matter loss vs. network composition after degradation tests.

Results are graphically illustrated in FIG. 13. As can be seen with reference to the Figure, the networks prepared from formulations without LAHEMA were found to gain 0.70-0.77% in weight, compared to 0.81-1.21 wt % for networks prepared with LAHEMA. The percentage of soluble matter lost during immersion was found to be none for all samples (FIG. 13). Compared to the commercial control, there was essentially no difference in any of the LAHEMA cured networks including visual inspection as.

Following the degradation tests, flexural properties were again obtained. For formulations with VER wt % in the range of 54-58% and LAHEMA varying from 0-21%, the modulus remains nearly constant at an average value of 2970 MPa. Further, the flexural properties of LAHEMA networks after the boiling water tests were found to be comparable to the commercial control.

Qualitative crosslink density and molecular weight loss following degradation were estimated by network selling in common solvents. Products were analyzed by extraction in $CH_2Cl_2$ and THF and the soluble matter was isolated. The average percent extractable matter for all formulations was less than 3% indicating excellent network formation. In general, slightly more material was extracted from the LAHEMA networks. All the extractables were analyzed by $^1H$ NMR spectroscopy, and the samples exhibited negligible amounts of LAHEMA.

FIG. 14 summarizes the VESRs that were formed and the results of the examination of the formed materials.

While the subject matter has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present disclosure should be assessed as that of the appended claims and any equivalents thereto.

What is claimed is:

1. A thermoset resin comprising a reactive intermediate, wherein the reactive intermediate includes a terminal reactive group, the reactive intermediate comprising a reaction product formed by a ring opening reaction of a lactide monomer present in a racemic lactide mixture during the reaction with a second material that includes the terminal reactive group, the racemic lactide mixture being derived from a renewable resource and comprising L-lactide monomer, D-lactide monomer, and meso-lactide monomer, wherein the reactive intermediate comprises the residue of the second material directly bonded to the ring opened lactide monomer, and the terminal reactive group is capable of reacting in formation of a cross-linked thermoset network.

2. The thermoset resin of claim 1, wherein the thermoset resin is a vinyl ester resin.

3. The thermoset resin of claim 1, wherein the thermoset resin is an epoxy resin, an unsaturated polyester resin, or a polyurethane resin.

4. The thermoset resin of claim 1, wherein the reactive intermediate is an oligomer.

5. The thermoset resin of claim 4, wherein the oligomer comprises a predetermined number of repeating units.

6. The thermoset resin of claim 1, wherein the reactive intermediate further comprises a residue of a third material derived from a second renewable resource.

7. The thermoset resin of claim 1, wherein the terminal reactive group is an acrylate group.

8. The thermoset resin of claim 1, wherein the terminal reactive group is selected from the group consisting of epoxy, isocyanate, unsaturated hydrocarbon, carboxylic acid, and combinations thereof.

9. The thermoset resin of claim 1, wherein the second material is aliphatic or aromatic.

10. A thermoset resin comprising an intermediate, wherein the intermediate includes a terminal reactive group, the intermediate comprising a reaction product formed by a ring opening reaction of a lactide monomer present in a racemic lactide mixture during the reaction with a second material that includes the terminal reactive group, the racemic lactide mixture being derived from a renewable resource and comprising L-lactide monomer, D-lactide monomer, and meso-lactide monomer, the intermediate comprising the residue of the second material directly bonded to the ring opened lactide monomer, and the thermoset resin further comprising a vinyl ester.

11. The thermoset resin of claim 10, wherein the intermediate is an oligomer comprising a predetermined number of repeating lactide units.

12. The thermoset resin of claim 10, wherein the terminal reactive group is an acrylate group.

13. The thermoset resin of claim 10, further comprising a styrene monomer.

14. The thermoset resin of claim 13, wherein the thermoset resin comprises less than about 40% of the styrene monomer by weight.

15. The thermoset resin of claim 13, wherein the thermoset resin comprises less than about 30% of the styrene monomer by weight.

16. The thermoset resin of claim 10, wherein the thermoset resin comprises less than about 45 weight % of the intermediate.

17. The thermoset resin of claim 16, wherein the thermoset resin comprises between about 35 weight % and about 45 weight % of the intermediate.

18. The thermoset resin of claim 16, wherein the thermoset resin comprises between about 5 weight % and about 28 weight % of the intermediate.

19. A method for forming a thermoset network comprising:
crosslinking a thermoset resin comprising an intermediate, the intermediate including a terminal reactive group, the intermediate comprising a reaction product formed by a ring opening reaction of a lactide monomer present in a racemic lactide mixture during the reaction with a second material that includes the terminal reactive group, the racemic lactide mixture being derived from a renewable resource and comprising L-lactide monomer, D-lactide monomer, and meso-lactide monomer, wherein the intermediate comprises the residue of the second material directly bonded to the ring opened lactide monomer.

20. The method of claim 19, the thermoset resin further comprising a vinyl ester.

21. The method of claim 20, the method further comprising combining the thermoset resin with a reactive material prior to crosslinking the thermoset resin.

22. The method of claim 21, wherein the reactive material is styrene.

23. The method of claim 19, the method further comprising forming the thermoset resin.

24. The method of claim 23, the method further comprising forming the intermediate.

25. The method of claim 24, the method further comprising forming the second material.

26. The method of claim 24, the method of forming the intermediate comprising providing the lactide monomer and the second material in a predetermined ratio.

27. The thermoset resin of claim 1, wherein the terminal reactive group is a methacrylate group.

28. The thermoset resin of claim 1, the reactive intermediate comprising up to nine repeating lactide monomers.

29. The thermoset resin of claim 1, the reactive intermediate comprising 2 or 3 repeating lactide monomers.

30. The thermoset resin of claim 1, the reactive intermediate comprising a single lactide monomer.

31. The thermoset resin of claim 1, wherein the second material is hydroxyethyl methacrylate.

32. The thermoset resin of claim 1, wherein the second material is glycerol monomethacrylate.

33. The thermoset resin of claim 10, wherein the terminal reactive group is a methacrylate group.

34. The thermoset resin of claim 10, the intermediate comprising up to nine repeating lactide monomers.

35. The thermoset resin of claim 10, the intermediate comprising 2 or 3 repeating lactide monomers.

36. The thermoset resin of claim 10, the reactive intermediate comprising a single lactide monomer.

37. The thermoset resin of claim 10, wherein the second material is hydroxyethyl methacrylate.

38. The method of claim 26, wherein the predetermined ratio is between 1:1 and 5:1.

39. A thermoset resin comprising a reactive intermediate, wherein the reactive intermediate includes a terminal reactive group, the reactive intermediate comprising a reaction product formed by a ring opening reaction of a lactide monomer present in a racemic lactide mixture during the reaction with a second material that includes the terminal reactive group, wherein the second material is glycerol monomethacrylate, the racemic lactide mixture being derived from a renewable resource and comprising L-lactide monomer and D-lactide monomer, wherein the reactive intermediate comprises the residue of the second material directly bonded to the ring opened lactide monomer, and the terminal reactive group is capable of reacting in formation of a cross-linked thermoset network.

* * * * *